United States Patent
Pieters et al.

[15] 3,674,707
[45] July 4, 1972

[54] REGENERATION OF SULFUR-POISONED RANEY NICKEL CATALYST

[72] Inventors: William Johan Meindert Pieters, Denville, N.J.; John Freel, Oakmont, Pa.; Robert Bernard Anderson, Ancaster, Ontario, Canada

[73] Assignee: W. R. Grace & Co., New York, N.Y.

[22] Filed: Oct. 21, 1970

[21] Appl. No.: 82,863

[52] U.S. Cl. ..................252/413, 252/411 S, 252/477 Q, 260/666 P
[51] Int. Cl. ..................B01j 11/76, B01j 11/30, B01j 11/02
[58] Field of Search...........252/413, 414, 412, 477 Q, 466 J, 252/4; 260/667, 666 P

[56] References Cited

UNITED STATES PATENTS

| | | |
|---|---|---|
| 3,489,694 | 1/1970 | Weidlich et al. ..................252/477 Q |
| 1,431,982 | 10/1922 | Richter et al. ..................252/413 |
| 3,165,478 | 1/1965 | Hauschild et al. ..................252/413 |
| 2,289,784 | 7/1942 | Houghton ..................252/413 |
| 2,326,275 | 8/1943 | Zeltner ..................252/477 Q |
| 2,950,260 | 8/1960 | Rosenbaum ..................252/477 Q |
| 3,454,364 | 7/1969 | Strum et al. ..................252/466 J |
| 3,480,531 | 11/1969 | Mulaskey ..................252/466 J |

Primary Examiner—Daniel E. Wyman
Assistant Examiner—P. E. Konopka
Attorney—Michael J. McGreal and Kenneth E. Prince

[57] ABSTRACT

Raney nickel catalysts which have been sulfur poisoned are regenerated by successive treatment first in an aqueous organic acid solution containing metal ions that form an insoluble sulfide in acid solutions, but which are soluble or decompose to soluble products and in an aqueous base solution. The catalyst is then separated and washed to remove traces of treating substances. The regenerated catalyst has an activity comparable to the freshly prepared catalyst.

10 Claims, No Drawings

REGENERATION OF SULFUR-POISONED RANEY NICKEL CATALYST

BACKGROUND OF THE INVENTION

This invention relates to a process for regenerating a sulfur-poisoned, porous, finely-divided catalyst for use in, for example, a hydrogenation process. The catalyst is prepared by initially making an alloy consisting essentially of nickel and aluminum, physically reducing the alloy to a finely-divided state, and chemically partially dissolving the aluminum from the alloy to form a porous finely-divided catalyst which comprises at least 2 weight percent aluminum and the remainder a major part activated nickel and a minor part chemically-bonded oxygen. The process for regenerating the sulfur-poisoned catalyst involves admixing the sulfur-poisoned catalyst in an aqueous solution containing an organic acid and metal ions that form an insoluble sulfide in an acid solution. The pH of the admixture is raised to between about 6.5 and about 8.0 by adding a base. By one technique, the pH of the admixture is first adjusted to 6.5–7.1 and in a second step to about 7.2 and about 8.0. The liquid portion of the admixture is removed to leave the catalyst portion, and the catalyst portion is washed to produce a regenerated, porous, finely-divided catalyst.

Apparently sulfur-poisoning involves the formation of nickel sulfide on the catalyst surface, and regeneration is achieved by formation of a different non-poisoning sulfide, by reaction of the nickel sulfide with introduced metal ions.

The catalysts of this invention may be employed in the hydrogenation of carbonyl-containing organic compounds to the corresponding hydroxy-containing compounds. They may also be employed in the hydrogenation of compounds containing aromatic unsaturation to form cycloaliphatic compounds, nitro groups to amino groups, or olefinic compounds to saturated compounds. The catalysts also may be advantageously employed in certain dehydration, dehalogenation and desulfurization reactions.

DETAILED DESCRIPTION OF THE INVENTION

The Raney nickel catalyst can be prepared by any method known to the art. The alloy from which the catalyst is prepared can contain from 30 to 60 weight percent nickel and from 40 to 70 weight percent aluminum. The examples give one method of preparing the catalyst. The fresh catalyst contains from 80 to 96 weight percent nickel, from 2 to 12 weight percent aluminum, and the remainder is essentially chemically-bonded oxygen.

Bases which can be used to partially leach or chemically dissolve the aluminum from the alloy include sodium hydroxide, potassium hydroxide, sodium carbonate, calcium carbonate, tetramethyl ammonium hydroxide, etc.

The regeneration of the Raney nickel catalyst can be achieved by the use of a variety of organic acids. The organic acid must not have a high reactivity with the Raney material. The preferred organic acid is tartaric acid.

Organic acids which can be used to regenerate the Raney nickel catalyst include: saturated monocarboxylic aliphatic acids, e.g., formic acid, acetic acid, propionic acid, isovaleric acid, etc.; saturated dicarboxylic aliphatic acids, e.g., oxalic acid, maloric acid, succinic acid, glutaric acid, adipic acid, pimelic acid, etc.; saturated tricarboxylic aliphatic acids, e.g., tricarballylic acid, etc.; hydroxy-substituted aliphatic acids, e.g., glycolic acid, lactic acid, α-hydroxybutyric acid, gluconic acid, tartronic acid, malic acid, tartaric acid, saccharic acid, citric acid, etc.; and alicyclic acids, e.g., cyclopentane-carboxylic acid, hexahydrobenzoic acid, hexahydrophthalic acid, etc. The useful organic acids must be at least partially soluble in water.

The metal ion that is placed in the organic acid solution is any metal ion that forms a sulfide that is insoluble in acid solutions. The preferred metal ion when tartaric acid is used is the stannous ion.

After the aged catalyst and the aqueous organic acid-metal ion solution are admixed, the admixture is preferably stirred, heated rapidly to at least 40° C. and held at that temperature for at least 5 minutes. The pH of the solution is then increased to between about 6.5 and about 7.1 by the addition of a base. The base is preferably in an aqueous solution, and the addition is preferably done by means such as titration. The temperature can be maintained at the elevated level during the addition of the base.

Any base can be used to adjust the organic-treated catalyst-containing solution to a pH between about 6.5 and about 7.1. The preferred base is sodium hydroxide, but examples of suitable bases are potassium hydroxide, sodium carbonate, ammonium hydroxide, calcium carbonate, etc.

Any base mentioned above can be used to raise the pH from between about 6.5 and about 7.1 to a value of about 7.2 to about 8 or above (up to as high as about 10). The preferred base is sodium hydroxide, and it is preferably in an aqueous solution. Before the base is added, the temperature of the admixture is lowered to a level below room temperature (about 0°).

The base treatments besides serving to activate the Raney nickel catalyst, also convert the insoluble metal sulfide produced in the organic acid treating step to a soluble condition so that it can be removed from the catalyst-base solution admixture by decantation, filtration or some other known technique of separating a solid from a liquid. Following such a liquid removal step, the rejuvenated Raney nickel catalyst is washed, preferably with a dried alcohol, to remove traces of the treating solutions.

The activities in this application were determined for the hydrogenation of cyclohexene in ethanol at 30° C. with the hydrogen pressure maintained at atmospheric pressure in a stirred micro-reactor. The reactor contained 5 cc. ethanol and about 40 mg. catalyst, and 0.1 cc. of cyclohexene was used. The hydrogenation was followed by measuring the uptake of hydrogen. Activities are based on the slope of the hydrogen consumption time curve at a conversion of 50 weight percent of the cyclohexene, divided by the weight of catalyst, but are reported here on a relative basis.

As used herein, the term room temperature is defined as a temperature between 60° F. and 80° F.

Weight percent or percent by weight as used throughout this application, unless otherwise specifically stated, is defined conventionally as grams per hundred grams of total composition (dry basis).

The following examples illustrate this invention. All percentages and parts therein are by weight, unless otherwise stated.

EXAMPLE 1

A nickel-aluminum alloy was prepared by adding 200 gm. of aluminum shot and 200 gm. of nickel shot to a graphite crucible. The optimum aluminum and nickel shot diameter was about ¼ inch; shot less than ¼ inch was difficult to stir, and shot greater than ¼ inch resulted in a very large exotherm. The crucible was placed in a furnace at about 1,100° C. Cooling caused by the crucible as well as heat loss caused by opening the furnace door, lowered the temperature to about 1,000° C. The crucible was removed from the furnace after about 15 minutes, at which time the furnace temperature was 1,075°–1,100° C. Immediately after removal from the furnace, the crucible contents were stirred with a carbon rod; no attempt was made to preheat the rod before stirring. After vigorous stirring for 30 seconds, the contents gradually turned red, and then metal solution took place, resulting in a white hot melt. The melt was stirred for an additional 15 seconds. The resultant alloy contained about 50 weight percent Al and about 50 weight percent Ni.

The nickel-aluminum alloy was easily crushed to jagged, irregularly shaped pieces about ¼ inch × ¼ inch in a jaw crusher. The pieces are then reduced to a fine powder (−200 mesh, U. S. Sieve Series), using a ball mill with ⅛ inch steel balls. The catalyst was prepared and activated by adding the −200 mesh alloy powder to a 1 liter resin kettle flask along with 100 ml. of tap water. Then 100 ml. of 40 percent NaOH solution was slowly added. After the addition of the first 10 ml. of NaOH, hydrogen evolved vigOrously, and the solution temperature rose rapidly to 90°–100° C. The first 50 ml. were added in 5–10 ml. increments over a period of 5 minutes, after which the remaining 50 ml. were added rapidly. A magnetic stirrer was used to keep the flask contents agitated. The total $H_2$ evolved was measured, using a wet test meter. The flask was heated to maintain the contents at a reflux temperature of about 107° C. The leaching (activation) time was 2 hours. After leaching (activation), the catalyst was washed with tap water by filling and decanting the flask 6 times. The porous Raney nickel catalyst contained 90 weight percent Ni, 3.1 weight percent Al, and the balance being oxygen. The catalyst had an activity of 240.

EXAMPLE 2

1.0 gm. of the freshly prepared Raney nickel of Example 1 was stirred in ethanol containing 0.01 cc. $CS_2$. After this treatment, the catalyst activity was 144. Two portions of the poisoned catalyst were then treated each with a solution of tartaric acid containing some stannous tartrate for 10 minutes at 50° C. (The tartaric acid solution was prepared by heating finely divided tin in an aqueous solution of 1 gm. tartaric acid in 50 cc. water for 3 hours. The solution was poured from the undissolved tin and used in the regenerations.) The solution was neutralized with NaOH, cooled to 0° C., and the pH carefully adjusted to 7.5 using NaOH. The catalyst was removed from the solution and washed with absolute ethanol. The two samples had activities of 200 and 210, respectively.

EXAMPLE 3

Example 2 was repeated, except that the fresh catalyst was poisoned with 0.013 cc. $CS_2$ per gram of catalyst to an activity of 104. The two regenerated samples had activities of 200 and 215, respectively.

EXAMPLE 4

Example 2 was repeated, except that the tartaric acid was replaced with lactic acid. A regenerated catalyst was obtained.

EXAMPLE 5

Example 2 was repeated, except that the tartaric acid was replaced with acetic acid. A regenerated catalyst was obtained.

EXAMPLE 6

Example 2 was repeated, except that the tartaric acid was replaced with formic acid. A regenerated catalyst was obtained.

EXAMPLE 7

Example 2 was repeated, except that the sodium hydroxide used for leaching and neutralizing was replaced with sodium carbonate. A regenerated catalyst was obtained.

EXAMPLE 8

Example 2 was repeated, except that the sodium hydroxide used for leaching and neutralizing was replaced with potassium hydroxide. A regenerated catalyst was obtained.

EXAMPLE 9

Example 2 was repeated, except that the solution of tartaric acid contained lead ions instead of stannous tartrate. A regenerated catalyst was obtained.

As used in this application, dried alcohol means an alcohol having up to about a 4–7 percent water content. Absolute ethanol is an ethanol having a 1 percent or less water content.

What is claimed is:

1. A process for regenerating sulfur-poisoned, porous, finely-divided catalyst, said catalyst having been prepared by preparing an alloy consisting essentially of nickel and aluminum, physically reducing said alloy to a finely-divided state, and chemically partially dissolving said aluminum from said alloy to form an active porous finely-divided catalyst, which comprises:
   a. admixing said sulfur-poisoned catalyst with an aqueous solution containing an organic carboxylic acid from the group consisting of saturated, hydroxy-substituted aliphatic, and alicyclic, and metal ions from the group consisting of stannous ions and lead ions that form an insoluble sulfide in an acid solution whereby a solid metal sulfide compound is formed;
   b. adding an aqueous solution of a base from the group consisting of sodium hydroxide, potassium hydroxide, sodium carbonate, ammonium hydroxide, and calcium hydroxide to raise the pH of this admixture to between about 6.5 and about 8.00, thereby solubilizing said metal sulfide compound;
   c. removing the liquid portion of the admixture, said liquid portion containing said metal sulfide compound; and
   d. washing a remaining solid portion, producing a regenerated, porous, finely-divided catalyst.

2. A process as in claim 1 wherein the pH of said admixture is first raised to about 6.5 to 7.1, and then in a second step raised to between about 7.2 and 8.0.

3. A process as described in claim 1 wherein said organic acid is tartaric acid and said metal ion in the stannous ion.

4. A process as described in claim 1 wherein after said admixing of step (a), the temperature of the resulting admixture is raised to at least about 40° C.

5. A process as in claim 1 wherein said organic acid is tartaric acid and said metal ions are lead ions.

6. A process as in claim 1 wherein said organic acid is lactic acid and said metal ions are stannous ions.

7. A process as in claim 1 wherein said organic acid is acetic acid and said metal ions are stannous ions.

8. A process as in claim 1 wherein said organic acid is formic acid and said metal ions are stannous ions.

9. A process as in claim 1 wherein said base is selected from the group consisting of sodium hydroxide, potassium hydroxide and sodium carbonate.

10. A process as in claim 9 wherein said base is sodium hydroxide.

* * * * *